United States Patent [19]

Bauer

[11] Patent Number: 5,510,798
[45] Date of Patent: Apr. 23, 1996

[54] MULTIPLE-ACCURACY GPS SYSTEM

[76] Inventor: William D. Bauer, 2055 16th St., Gering, Nebr. 69341

[21] Appl. No.: 42,471

[22] Filed: Apr. 2, 1993

[51] Int. Cl.$^6$ ............................. H04B 7/185; G01S 5/02
[52] U.S. Cl. .................................................. 342/357
[58] Field of Search ............................................. 342/357

[56] References Cited

U.S. PATENT DOCUMENTS

| | | | |
|---|---|---|---|
| 4,751,512 | 6/1988 | Longaker | 342/357 |
| 4,782,531 | 11/1988 | Karr | 381/14 |
| 4,814,711 | 3/1989 | Olsen et al. | 324/331 |
| 4,894,655 | 1/1990 | Joguet et al. | 340/988 |
| 4,928,106 | 5/1990 | Ashjaee et al. | 342/352 |
| 5,023,934 | 6/1991 | Wheeless | 455/45 |
| 5,043,736 | 8/1991 | Darnell et al. | 342/357 |
| 5,045,848 | 9/1991 | Fascenda | 340/825 |
| 5,063,610 | 11/1991 | Alwadish | 455/45 |
| 5,122,795 | 6/1992 | Cubley et al. | 340/825.44 |
| 5,249,303 | 9/1993 | Goeken | 455/33.4 |
| 5,323,322 | 6/1994 | Mueller et al. | 364/449 |

FOREIGN PATENT DOCUMENTS

| | | | |
|---|---|---|---|
| 0507096 | 10/1992 | European Pat. Off. | H04H 1/00 |
| 0574009 | 12/1993 | European Pat. Off. | G01S 5/14 |
| 4136136 | 3/1993 | Germany | G01S 5/02 |

OTHER PUBLICATIONS

Enge et al., "Differential Operation of the Global Positioning System," I.E.E.E. Communications Magazine, vol. 26, No. 7, Jul. 1988, pp. 48–59.
The Navstar Global Positioning System; Tom Logsdon; 1992; pp. 76–90.
GPS A Guide to the Next Utility; Trimble Navigation, Ltd.; 1989; pp. 58–61.
9600 BPS Subcarrier Data System; S.C.A. Data Systems, Inc.; date unknown.
GPS Approaches; IFR; Feb., 1993; pp. 22–24.
RTCM Recommended Standards for Differential Navstar GPS Service; Radio Technical Commission for Maritime Services; Jan. 1, 1990.
Business & Commercial Aviation; The Satnav Revolution Starts Now; Dec., 1992; pp. 68–72.
United States RDS Standard; Draft No. 1.6 NRSC Document; Mar. 5, 1992; pp. 1–6; pp. 55–58.
Motorola Mobilizes for Wireless World; Chicago Tribune; Nov. 22, 1992; p. 3.
GPS World–Land Navitgation; Trimble Navigation; Precision GPS Navigation for Improving Agricultural Productivity.
News Release; CUE Network Corporation; Sep. 24, 1992.
GPS World; Global View; National DGPS Service Planned; Nov., 1992; p. 18.
Farm Journal; Farm by the Foot; Mid–March 1989; pp. 11–18a.
Differential GPS Format for RBDS; Magnavox Electronic Systems Company; Oct. 5, 1992.
From Here to There; Wall Street Journal.
Broadcast Communique; Harris Allied; Radio Today.

Primary Examiner—Theodore M. Blum
Attorney, Agent, or Firm—Luke Santangelo

[57] ABSTRACT

A GPS system for both generating and receiving multiple differential corrections from a single broadcast transmission may involve FM subcarrier modulations at any carrier frequency or subcarrier offset to provide multiple differential correction signals having varying accuracy. Signals may be encrypted and enabled through a controllable address signal to be provided on a subscription basis. Subcarrier transmissions are provided for in overlapping manner for redundancy and with either separate or interleaved differential signals so as to be able to both broadcast differential corrections and informational signals using existing equipment and FM stations at any available offset with both uplink and downlink capabilities. Similarly at least one FM receiver component is included within a traditional GPS receiver to simultaneously receive, scan, locate, and compare differential signals for more accurate determination of location in a reliable and optimum manner and at differing locations.

28 Claims, 2 Drawing Sheets

MULTIPLE-ACCURACY GPS SYSTEM

I. BACKGROUND OF THE INVENTION

This invention relates generally to the utilization of Navstar global positioning system (GPS) signals to determine position. Specifically, the invention relates to methods and devices for delivering and receiving differential GPS correction for more accurate determination of position.

The Navstar GPS is a navigation system for ascertaining position based upon signals received from orbiting satellites. These satellites, financed by the US Department of Defense, transmit accurately timed gigahertz signals in the L-band from which the user can determine position through timing and triangulation techniques. Although the Navstar system is considerably more accurate than most other radio navigation systems, it is subject to undesirable limitations for a variety of reasons. First, physical phenomenon introduce errors. Since the satellite signals are transmitted through the earth's atmosphere, they are subject to distortions, delays, relativistic effects, and other physical impacts which degrade accuracy. In addition, equipment limitations can impact accuracy. For instance, since many GPS receivers use inexpensive internal clocks, timing may not be as accurate as desired.

Perhaps the most significant limitation in accuracy is due to the fact that limitations are purposefully built into the system for national security. Since the Navstar satellites are primarily for military purposes, the US Department of Defense has purposely limited the accuracy of these signals for civilian users. This is facilitated by providing two different signals: a precision code signal (P-Code) available for government use and a course acquisition code signal (C/A-Code) for civilian use. The accuracy of the P-Code signal at a 95% probability level without further correction is on the order of 25 to 30 meters. The Department of Defense selectively introduces an error in to the C/A-Code signal so that a similar accuracy is on the order of 100 meters (330 feet). Naturally, since civilian users do not have access to P-Code signals, this accuracy is of significant concern as commercial applications expand.

To improve upon the accuracy of the Navstar system, one technique has been developed by groups such as the United States Coast Guard—differential GPS navigation. This technique is based upon the fact that both inherent and intentional errors are approximately the same within a given locale. By receiving the GPS signals at a known location, the error in location can be determined and transmitted to users in the vicinity of that known location. This error, potentially represented by a set of correction values such as satellite ephemeris and clock bias errors for each satellite, can greatly improve the accuracies of the system. For instance, utilizing differential GPS techniques in conjunction with other corrections, accuracies of considerably less than one meter have been achieved. To transmit the differential GPS correction, a variety of techniques have been suggested including satellite, person-to-person, and ground based transmissions. Typically, the ground based techniques have involved dedicated transmitters using specific frequency allocations and licensing. Due to limited frequency availability, this has resulted in limiting the useful transmission range of such systems.

In attempting to provide a more accurate determination of location, prior efforts have naturally focused on providing as accurate a correction as possible. Unfortunately the technical focus of this approach has in many instances caused those involved to overlook the commercial realities necessary to effectively implement a differential GPS system on a widespread basis. While those involved have made great technical strides and even developed correction techniques capable of centimeter level accuracies, they have not developed a system which can be practically implemented. Problems such as the initial expense of such systems, the recovery of the cost of placing and maintaining such systems, and the equipment impacts for users who may not require maximum accuracy have not been fully addressed. As a result, differential GPS corrections have not yet become available for widespread use.

Certainly, those involved in the industry have appreciated the desirability of providing differential GPS correction in a cost effective manner. To date however, they have not fully satisfied this desire. This may be due, in part, to a preoccupation with the technical challenges, limitations in range and reliability, or to presumptions regarding attaining the maximum accuracy in a single differential GPS signal. As a result those involved in providing differential GPS signals, have overlooked the solutions proposed by the present invention even though the needed implementing arts and elements had long been available.

Not only have the technical directions taken by those involved with differential GPS navigation lead away from the direction taken by the present invention, but the directions used in unrelated arts have also done so to some extent. For instance, as explained later, the invention may involve the use of subcarrier broadcasts to provide differential GPS correction. Within this art, pre-existing standards for the broadcast of data have been established. These standards might suggest that an adequate transmission rate is not available for differential GPS correction. The present invention establishes that, in fact, such potential limitations do not exist.

Basically, it appears that to some degree attempts at providing differential GPS correction in a commercially feasible manner have, until the present invention, been limited because those skilled in the differential art have simply failed to understand that the problem of delivery was not purely technical in nature. To an extent they failed to address the need for cost recovery and failed to realize that multiple accuracy corrections could afford significant commercial advantages. Each of these contribute to a practical system which can be implemented on a widespread basis. Thus, until the present invention, those skilled in the art simply failed to realize that simple modifications of existing concepts could achieve a solution. Until the present invention, no system achieved a practically balanced delivery of differential GPS correction let alone multiple differential GPS corrections with the commercially attractive features of the present invention.

II. SUMMARY OF THE INVENTION

Accordingly, the present invention includes both differential generator and differential receiver designs. The differential generator provides multiple differential GPS correction signals which may have varying accuracies. These signals may be provided through one or more subcarrier modulations on an existing FM carrier transmission. Encryption or encoding is provided for access control when commercially desirable. The overall signal generator uses a processor to derive multiple differential GPS signals which are then input to a subcarrier generator. Appropriate differential GPS codes are then received by a subcarrier receiver integrated with a GPS receiver to accurately determine position.

A general object of the invention is to provide a system which can deliver differential GPS correction in a commercially feasible manner. Thus, one goal is to provide multiple differential GPS correction signals which may be tailored to specific applications. These corrections may have varying accuracy or may be tailored to specific receivers. Thus a goal is to optimize the transmission of differential GPS correction to allow the user to achieve only the accuracy desired. Another goal is to provide differential correction on a subscription basis. In keeping with the object of commercial feasibility, it is also a goal to provide the multiple signals through a single broadcast transmission. Additionally a goal is to provide a signal which can be encrypted and which can enable specific receivers to utilize the differential GPS corrections provided.

Another object of the invention is to provide differential GPS correction over a widespread area with a minimum of broadcast sites. Thus one goal is to use non-line-of-sight transmissions. A further goal is to utilize existing equipment to the largest extent possible. Hence, it is a goal of the invention to utilize available subcarrier bandwidth from existing FM broadcast stations.

Still another general object is to provide both generator and receiver designs. In keeping with this object, a goal is to utilize existing components and equipment where possible. Thus, a more focused goal is to provide a system and designs which integrate with existing GPS receivers and which require minimal additional equipment or components.

Naturally, further objects of the invention are disclosed throughout other areas of the specification and claims.

III. BRIEF DESCRIPTION OF DRAWINGS

IV. DETAILED DESCRIPTION OF THE PREFERRED EMBODIMENTS

Figure 1:
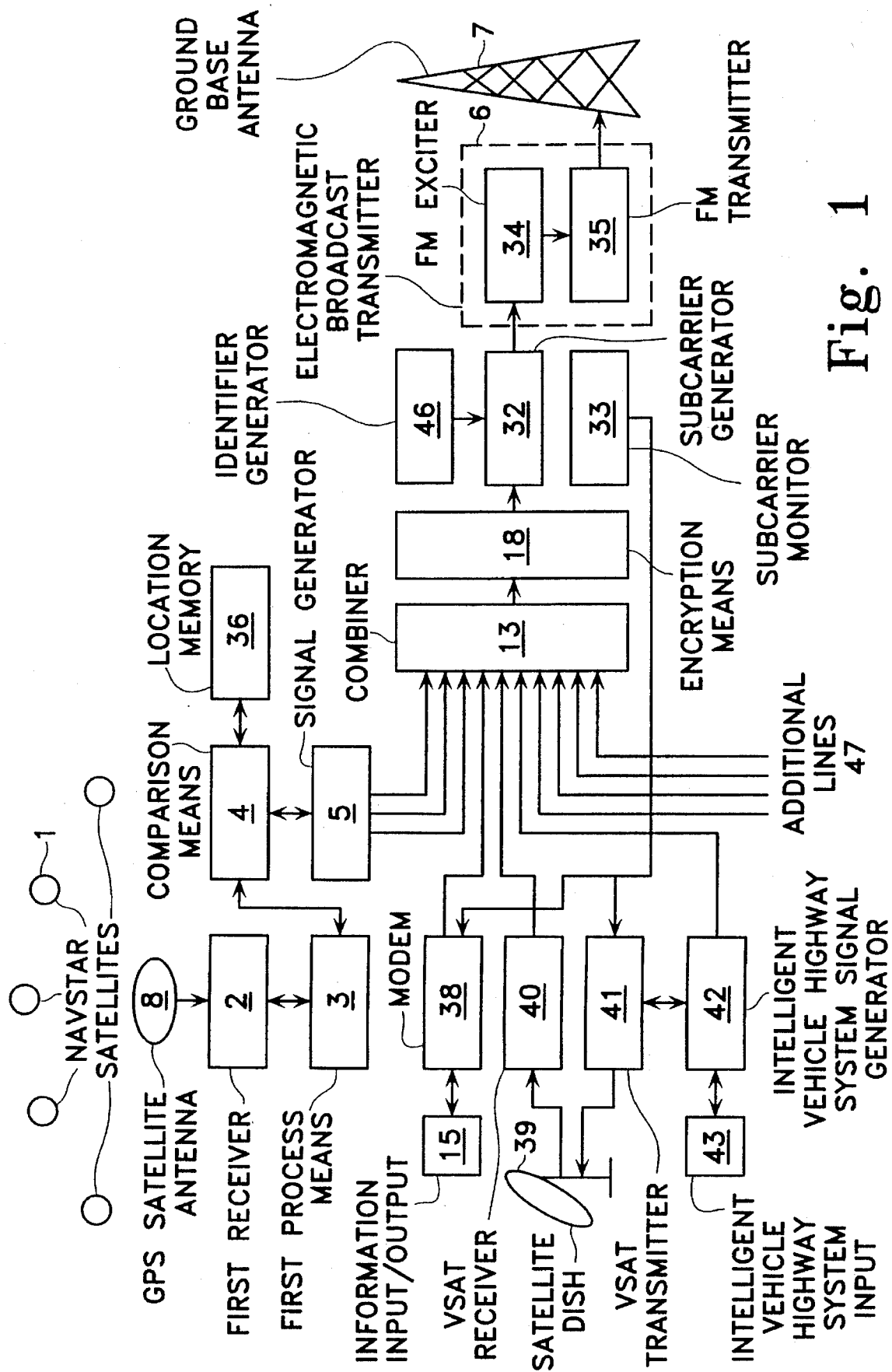
FIG. 1 is a block diagram of a differential GPS signal generator.

As can be seen from the drawings, an overall system according to the present invention involves both generator and receiver designs. Referring to FIG. 1, a block diagram of a differential GPS signal generator, the basic Navstar system can be most easily understood. In basic form, GPS involves a number of Navstar satellites (1) which continuously transmit signals sensed by a GPS satellite antenna (8). These signals are transmitted in the L-band at 1575.42 megahertz and 1227.6 megahertz. As shown in both FIG. 1 and FIG. 2 these GPS signals are sensed by a GPS satellite antenna (8) which provides them as an input to a GPS receiver so that it is responsive to these signals. This GPS receiver is shown in FIG. 1 with respect to the generator as first receiver (2) and in FIG. 2 with respect to the receiver design as second receiver (9). These receivers provide some input to first and second processor, (3) and (12) respectively, in order to determine the location indicated by the GPS signals. Naturally, while these processors are shown separately from the receiver in each diagram, they may be included as part of an integrated receiver design.

Referring to FIG. 1, the generator block diagram, the details of a system to provide differential GPS correction can be understood. The differential GPS correction may be arrived at by conceptually comparing a GPS signal-indicated location with the known location of the GPS receiver. As shown in FIG. 1, the known location, or actually data representative of the known location, may be stored in location memory (36). Both the output of location memory (36) and first processors (3) are available to some comparison means (4). Comparison means (4) can then serve to arrive at the appropriate; correction value or values for a specific differential GPS correction through creating a comparative representation. This representation may be input to signal generator (5) to create one or more differential corrections. These can be represented by signals which are then provided as input to the remainder of the system to ultimately be broadcast through electromagnetic broadcast transmitter (6) and ground-based antenna (7). Thus by utilizing traditional GPS techniques, a GPS signal-indicated location can be calculated and compared to a known location to create a differential GPS correction with respect to at least one of the satellites GPS signals. With respect to each aspect of this disclosure, it should be understood that although a variety of separate components are shown in the figures for conceptual understanding, the components can naturally be combined or they can be accomplished by separate capabilities. This is particularly true for aspects which may be achieved by programmable components and the like. As only one such example, naturally location memory (36), comparison means (4), and signal generator (5) could be combined or programmed into a programmable processor or separately achieved by a connected computer. Other possibilities of combining or splitting components are also possible throughout the invention.

In order to achieve a commercially desirable system, signal generator (5) may include variable programming or other capabilities or components so as to be able to create more than one differential GPS correction. Since, in a preferred embodiment as presently contemplated, signal generator (5) actually is contained within an existing differential GPS base station such as model RTK 1 from Trimble Navigation Ltd., the standard single differential GPS correction output could be modified to provide multiple accuracy signals. Using this base station, the highest accuracy signal may be accomplished by utilizing the original, high-accuracy differential correction, such as the real-time kinematic correction as provided. This signal can include differential, carrier phase, and other correction components. By further processing, this high-accuracy signal can be processed to provide an intermediate accuracy. As one such example, available software could be employed to transform the signal to a more common (and less accurate) RTCM-format differential correction. Further to provide an even lesser accuracy signal, a time delay could be introduced by looping one of the signals back for further processing as those skilled in the art would readily understand. Through this arrangement a set of signals having multiple accuracy could be achieved. Naturally other techniques could be employed such as utilizing multiple base station components and the like. These signals could then be output in parallel as shown or in series through interleaving and the like for eventual broadcast. With respect to the particular modes of providing multiple differential GPS corrections, it should be understood that a variety of signal generators and other components are possible. Accordingly, the claims are not limited to a specific architecture or design.

In order to enhance the commercial feasibility of the design, the differential GPS corrections may also be combined or interleaved with other information prior to dissemination. In the embodiment shown, this may be accomplished by inputting the signal or signals representative of the differential GPS corrections and those containing specific information into combiner (13). As those skilled in the art readily understand, combiner (13) serves to integrate the various signals for dissemination. While combiner (13) may merely be an electrical connection, in the preferred embodiment, a multi-port RS 232-type combiner such as model Plus 8—8 from Industrial Computer Source has been utilized to allow for variability. Naturally a great variety of devices might be used to integrate the signals, including other interleave means or merely tying leads together.

As shown in FIG. 1, the signals may also be processed by some encryption means (18) which may be a separate component or merely programming. While shown to occur after the signals have been combined, naturally, this may occur at any point and may even be achieved through combining itself. Since encryption can occur through specific processing, it may occur to only a portion of the combined signal through framing coordination and the like. For instance, even when configured as shown in FIG. 1, the portion of the signal containing information which might enable receipt of the signal and that containing the least accurate differential correction might remain unencrypted. In addition to the variation possible in the signals selected for encryption, a variety of encryption techniques are also possible. As one of the many possible techniques, quadrature phase shift keying, even though a modulation technique, may be utilized as an encryption technique through use of a properly programmed chip as available from SCA Data Incorporated. Alternatively, encryption may be achieved by merely combining the signals through use of the multi-port RS 232-type combiner mentioned earlier. Regardless of the specific technique utilized, encryption means (18) serves to facilitate the delivery of differential GPS correction on a subscription basis by selectively making a differential GPS correction signal available to only those who pay the appropriate subscription fee. This serves the important purpose of making the system commercially feasible in that the cost of disseminating and broadcasting the differential GPS correction can be recouped.

Prior to subcarrier modulation, the signal may be further conditioned for efficient transmission. This may be achieved by programming within encryption means (18) (actually a computer programmed to process the signals in the embodiment presently preferred) or by a separate framing processor. As those skilled in the art would readily understand, this further processing could take a variety of forms. Since multiple signals may be involved, this conditioning might include framing and packetizing. In addition, forward error correction (49) may be provided. This could be as part of the packet information or as separate conditioning. As presently envisioned, a modified Hamming code algorithm might be used for forward error correction within the packet information.

After encryption and possibly conditioning, the entire signal is shown as an input to electromagnetic broadcast transmitter (6). Electromagnetic broadcast transmitter (6) may include subcarrier generator (32). Naturally, subcarrier generator (32) may be a physically separate component as well. Rather than provide a single transmission dedicated specifically to differential GPS correction, the embodiment shown utilizes existing capability, bandwidth, and licensing to the largest extent possible. The broadcast can be on any carrier frequency at any subcarrier offset. Each location broadcasting differential corrections need not have the same frequency or offset and can be changed over time as pricing or other such practical conditions warrant. As contemplated, the preferred broadcast sites would be FM radio stations. In such instances, electromagnetic broadcast transmitter (6) would already include FM exciter (34) and FM transmitter (35). This arrangement offers several advantages.

First, by utilizing existing capability, the entire system cost is minimized. Second, by utilizing existing stations, regulatory impact and licensing needs may be avoided to some extent since the subcarrier capabilities of existing FM stations are not often fully utilized. Next, by allowing for different subcarrier offsets at different locations, broadcast locations can still be utilized even though one offset is not available. In addition, by utilizing FM broadcast transmissions, line-of-sight limitations are avoided. FM transmissions are in the 88 to 108 MHz band; they are not significantly attenuated by buildings or trees in their path and tend to follow the curvature of the earth to an extent. By selecting this bandwidth for broadcast, the differential GPS corrections can be made available throughout a larger area than traditional line-of-sight ground based transmissions. Importantly, in this regard the invention breaks from some traditional teachings by both utilizing a different frequency than typically involved with GPS signals and by not demanding transmission of differential GPS corrections throughout their entire practically useful area (ie. at hundreds of miles distant from the differential generator). In this manner, the differential GPS corrections are transmitted at a predominant frequency of about 88 to 108 MHz. This further affords the advantage of allowing for redundant dissemination as numerous FM signals often are available at a given location. Naturally other non-line-of-sight frequencies could also be used as well as other existing transmission or broadcast capabilities such as AM stations, however, practical impacts such as reflections off the ionosphere and the like might make this latter option less desirable for most applications. To avoid the line-of-sight limitations frequencies of less than approximately a few hundred MHz are contemplated. Similarly, due to data transmission needs, frequencies of more than approximately a hundred KHz may be desirable.

As shown in FIG. 1, electromagnetic broadcast transmitter (6) may also receive a signal from identifier generator (46) and may have its output sensed by subcarrier monitor (33). Each of these components is included to enhance commercial performance but is not required in order to achieve some of the more basic embodiments. Identifier generator (46) can serve to provide a specific identification code in order to enhance scanning and signal acquisition times and may be configured as an input to subcarrier generator (32). Basically, identification generator (46) is designed to continuously include an easily identifiable signal during pauses in the differential or information transmissions on the subcarrier modulation so as to allow a quick determination as to whether differential GPS codes are provided through that FM transmission. In the scanning mode discussed in more detail later, the receiver would scan for FM transmissions which include the appropriate identifier.

Additionally, subcarrier monitor (33) may be provided for applications where backlink monitoring is desirable. Subcarrier monitor (33) could create information concerning the status and quality of the subcarrier transmission actually broadcast. As shown in FIG. 1, subcarrier monitor (33) provides this signal to modem (38) which could provide a signal to some type of information input/output (15) such as a telephone line. Similarly it could provide the signal to a VSAT (very small aperture transmission) satellite transmitter, VSAT transmitter (41). VSAT transmitter (41) would then be linked to satellite dish (39) to provide an uplink information capability. Again, this is not required in order to practice the invention but may be commercially advantageous in certain applications.

In addition to the uplink information capability shown in FIG. 1, a generator, according to the embodiment shown in FIG. 1, might also include optional downlink information capabilities. As shown in FIG. 1, three types of data capabilities can be provided. First, information input/output (15) and modem (38) can operate to provide a signal to be input to combiner (13) and for ultimate transmission by electromagnetic broadcast transmitter (6). This information could be of a varied nature including highway, weather and other user information as well as specific subscription information. As such, information input/output (15) or perhaps a computer providing such information might serve as an information signal generator. With respect to subscription information, this information signal generator might act as a controllable address generator so as to provide serial number or other specific receiver information in order to enable receipt by one receiver. By including this type of signal with the differential GPS corrections provided from signal generator (5), an information signal which enables receipt of the differential GPS corrections can be achieved. Naturally, this aspect could be achieved either before or after the action of encryption means (18). It may also go through encryption means (18) unaffected for further conditioning as mentioned earlier. When achieved after encryption means (18), the controllable address generator might be provided as another type of input to subcarrier generator (32) similar to that of identification generator (46).

Satellite download capability might also be achieved through the use of satellite dish (39) and VSAT receiver (40). Again, as those skilled in the art would readily understand VSAT receiver (40) could provide another input to combiner (13) to achieve either pure information downlink capabilities or specific receiver enablement. Since specific receivers could thus be addressed, it is possible through each of these techniques that information specific to that one user could be provided throughout a large area since the actual user's location may not be known. This could occur periodically or regularly by transmission during pauses in the transmission of the other information or differential corrections. Since the entire system is designed to be utilized on a subscription basis, this would facilitate cost recovery needs and would serve to make the system more commercially feasible.

For specific applications, tailored information download capabilities can also be provided. As shown in FIG. 1, the system designed may include intelligent vehicle highway system (IVHS) input (43) and IVHS signal generator (42) for road conditions and the like. This aspect could be tied with VSAT transmitter (41) and could also provide yet another information input to combiner (13) as shown. Naturally a variety of information capabilities could also be included or easily added through the utilization of additional lines (47) into combiner (13) including message capabilities and the like. Upon receipt, this information could also be further processed and selected based upon the user's determined location. As with other features shown in the drawings, such is shown to illustrate the great degree of variation capable in specific generator and receiver designs. While initially the preferred embodiment contemplated might provide only basic information capabilities such as that available through the use of information input/output (15) and modem (38), expansion is provided for. Naturally as the demand for the system grows, additional capabilities should be easily added. In keeping with this objects, the design shown illustrates a variety of alternatives in order to enhance understanding of the variations possible which fall within the scope of this patent.

As shown in FIG. 1, the multiple differential GPS corrections output by signal generator (5), are provided for single broadcast to afford cost savings. Other efficiencies can be gained through optimal utilization of subcarrier generator (32). Subcarrier generator (32) might be configured or programmed so as to create one or more subcarrier transmissions at any selected subcarrier offset. When configured to provide multiple channels of subcarrier signals, these channels might be adjacent subcarrier transmissions to minimize bandwidth requirements. To avoid conflict with existing subcarrier transmissions, it is believed that a frequency offset of 67 KHz might be desirable. As mentioned, naturally this offset can be varied to accommodate availability and the like. The offset of 67 KHz, however, can allow a wide bandwidth for greater information capabilities. In this regard, the invention departs from any suggestion to integrate with existing subcarrier transmission structures at only the 57 KHz offset. The present invention can do this, but it need not and, importantly, receiver designs would not need any change in capability. In addition, the use of the full bandwidth of the "67 KHz" subcarrier (from about a 60 KHz offset to about a 75 KHz offset) allows high data transmission rates such as those necessary for a 9600 baud transmission. This avoids the limitations which are inherent in other data transmission services and formats where as little as 50 baud is typically available. This limitation in data transmission rate is significant as a typical differential GPS correction transmission will presently require appropriately 600 baud. Due to information needs, providing three different levels of accuracy might demand about 3000 baud or a bandwidth of as little as 5 KHz. As mentioned, this could be provided in separate adjacent subcarrier transmissions or could be provided in one interleaved subcarrier transmission where more than one correction could be provided as part of a single subcarrier transmission. When provided in a multi-channel format, bandwidth can also be allocated for optimal signal presentation. Thus, since greater accuracy demands greater information, a larger bandwidth could be provided. Naturally each of these bandwidths should be sufficient to allow for appropriate error correction and transmission capabilities.

Figure 2:
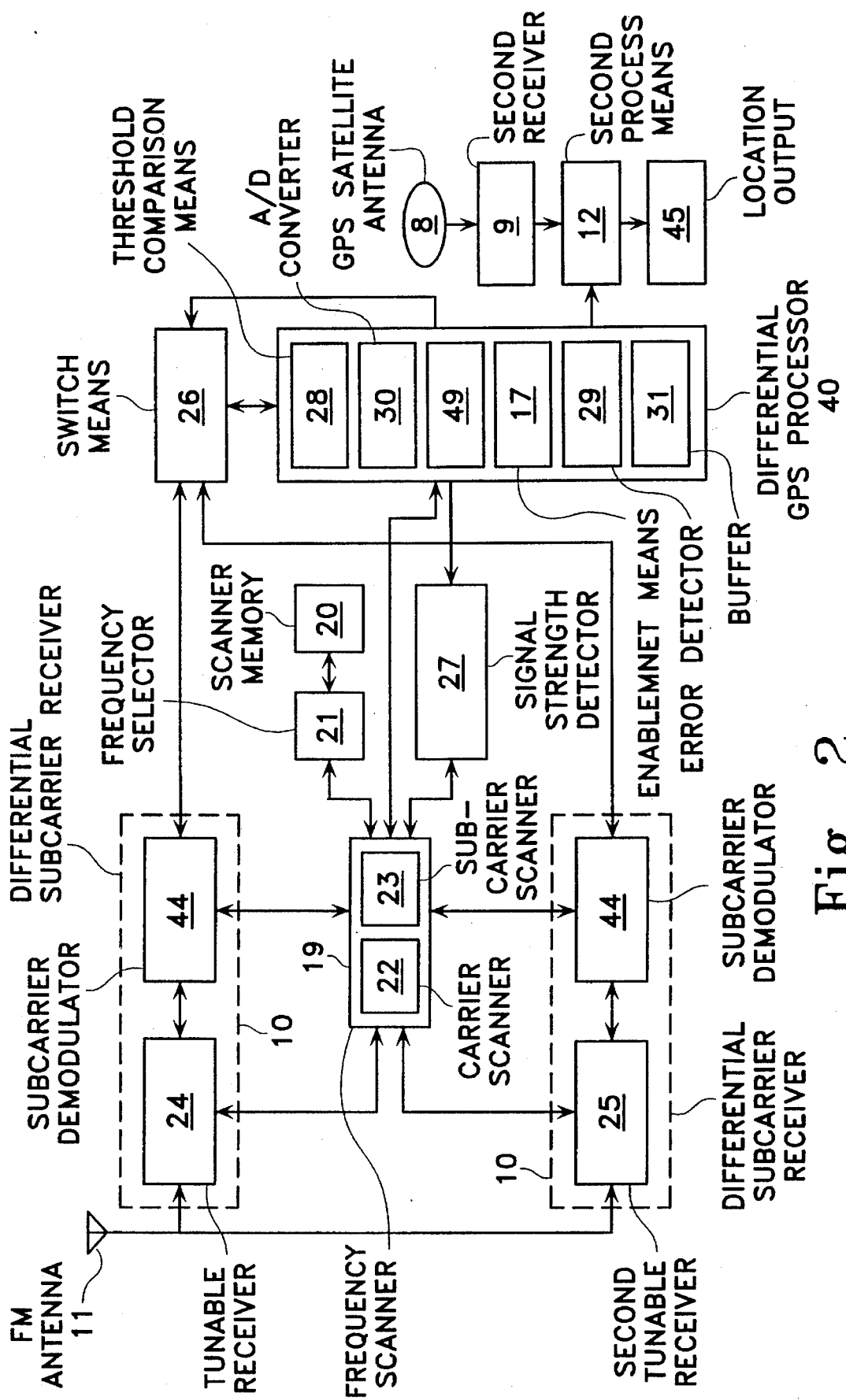
FIG. 2 is a block diagram of a receiver utilizing both GPS and differential signals.

Referring to FIG. 2, a receiver design according to the invention can be understood. As mentioned earlier, the receiver involves GPS satellite antenna (8) and second receiver (9) in a traditional fashion so as to be able to sense a GPS signal-indicated location through the operation of second processor (12). As also traditionally utilized, second processor (12) can provide some type of location output (45) either by display or as input to other components. The receiver, according to the present invention, may also involve at least one differential subcarrier receiver (10). Although in FIG. 2, two different differential subcarrier receivers (10) are shown, as will be discussed later with respect to the scanning capabilities of the receiver, this aspect is not necessary in order to merely achieve differential GPS correction.

Conceptually, a single differential subcarrier receiver (10) responds to differential GPS corrections sensed by FM antenna (11) and then provides these corrections as input to differential GPS processor (48). Differential processor (48) would then act to convert the broadcast transmission into a signal such as a digital signal by A/D converter (30) and would then act to provide it as input to second process means (12). Second processor (12). Second processor would then utilize both the GPS signal-indicated location and the appropriate differential GPS corrections in order to provide the actual location of GPS satellite antenna (8) to some higher degree of accuracy.

As mentioned with respect to a generator design according to the present invention, the differential GPS correction provided may not always be at a known carrier frequency or subcarrier offset. Accordingly, differential subcarrier receiver (10) can include tunable receiver (24). Tunable receiver (24) may be controlled through the operation of frequency scanner (19). Frequency scanner (19) may include a component or programming as a carrier scanner (22) to locate FM carrier signals which are available and in the vicinity of the user. Once a carrier signal has been located, a subcarrier transmission could be similarly located. Note that while a subcarrier offset of 67 KHz is desirable at present, for availability and other reasons, such offset can vary. Accordingly, subcarrier demodulator (44) may be similarly controlled by a component or program to act as subcarrier scanner (23) to automatically locate either an available or an optimum differential GPS correction. Subcarrier demodulator (44), and even the tunable receiver may be achieved by a hybrid chip or the like. Both carrier scanner (22) and subcarrier scanner (23) might combine to serve as frequency scanner (19) so as to operate in conjunction with tunable receiver (24) to efficiently locate the appropriate signal without user involvement.

In scanning, a variety of decision techniques could be utilized. First, some type of memory could be utilized alone or in conjunction with the identifier mentioned earlier in order to minimize the acquisition time. As shown in FIG. 2, this might include scanner memory (20) as an input to frequency selector (21). Frequency selector (21) could then control either or both the carrier scanner (22) and possibly subcarrier scanner (23) in order to initialize the carrier frequency and offset at which to look for either the identifier or the differential GPS corrections. In this fashion, the receiver could be configured to recall the last carrier frequency and offset and to first test that configuration for availability. Thus, if the user had not significantly moved in position since the receiver was turned off, the unit might first acquire the signal which was last utilized and thus save time in the acquisition phase. Additionally, differential processor (48) could serve the same task.

Either in addition or alternatively, frequency scanner (19) could be operated as a signal optimization means so as to select an optimum signal. As shown in FIG. 2, this might include utilization of the capabilities of differential processor (48) to control or augment carrier scanner (22) and subcarrier scanner (23). Naturally a signal which is deemed "optimum" could be determined in a variety of ways such as the strongest signal, the closest signal, a signal above an acceptable threshold, or even the signal having the highest amount of transmission accuracy. When configured so as to sense the strongest signal, the receiver design might include signal strength detector (27) so as to provide some input to differential processor (48). By providing some indication of the strength of the particular signal receiver, signal strength detector (27) could allow differential processor (48) to act as some threshold comparison means. For convenience, this has been shown as threshold comparison means (28) within differential processor (48), however it should be understood that this could be accomplished through a separate component as well as a subroutine or programming as available to differential processor (48). When configured to serve as threshold comparison means (28), such programming could be established so as to compare with acceptable thresholds and thus interactively control carrier scanner (22) and subcarrier (23) until a signal of acceptable strength has been located.

Similarly, differential processor (48) could be configured through programming to act as an error detector (29). As mentioned earlier, since the subcarrier transmission provided by the generator might include some type of error correction, it could be appropriate for error detector (29) to sense the number of errors actually received in the transmission. This might serve as one type of signal strength threshold. If the number of errors grew too large, differential processor (48) could be configured so as to cause carrier scanner (22) and subcarrier scanner (23) to look for another differential GPS correction signal or to inform the user of potential unreliability. Once located, this new signal could then be accepted by differential processor (48) and transformed through A/D converter (30) for utilization by second processor (12). As those skilled in the art would readily understand, naturally a variety of signal optimization techniques and even combinations of the above could be utilized. The design, however, is not limited by these specific techniques.

As mentioned, in order to speed the scanning time needed, the identifier provided to the generator through identifier generator (46) need only be located on the subcarrier transmission. Naturally, this could be compared to stored locations of known differential generator sites for further processing and more rapid scanning even before actual receipt of the differential GPS corrections is accomplished. Also, since initialization of the GPS receiver itself takes a significant amount of time, a single receiver could act to select a number of possible signals initially. These could be stored for later retrieval, of course.

As shown in FIG. 2, differential processor (48) also may include enablement means (17). Enablement means (17) may be programming so as to allow sensing of the appropriate information signal such as a serial number in order to activate differential sensing. In this manner, enablement means (17) acts to afford the provision of signals on a subscription basis and may even allow the transmission of personalized information to the specific receiver involved. This could be easily accomplished by programming to trigger the enablement upon sensing of the appropriate identification code or address so as to unlock the receiver for a specific period of time. Naturally, this could be automatically deactivated after a certain period of time so as to assure continued payment of the subscription fees involved. In addition, enablement means (17) may be separately provided and need not be limited to configurations within differential processor (48).

For applications in which continuous sensing of the differential GPS corrections is required, a second differential correction receiver could be utilized. As shown in FIG. 2, the second differential correction receiver might involve a second tunable receiver (25) possibly together with a similar subcarrier demodulator (44). Each differential subcarrier receiver (10) whether including only a tunable carrier receiver or a tunable carrier receiver in conjunction with a subcarrier demodulator could be controlled by a separate frequency scanner or by the same frequency scanner (19) as discussed earlier. In this configuration, while one differential subcarrier receiver (10) was acting to sense the appropriate signal, the other might act to locate a second differential correction which was either the next best or an even better signal. These could be received simultaneously by two receivers or could similarly be received simultaneously by one receiver programmed to timeshare its capabilities as discussed later. When two receivers are involved, through the use of buffer (31) and switch (26), differential processor (48) could then cause switching in an uninterrupted fashion from one differential GPS correction transmission to another.

As mentioned, switching could be achieved by even a single differential receiver if operated so as to look for other frequencies during pauses in its operation. Thus programming or components could be included as a broadcast test means to allow for a step of periodically testing for alternative differential correction broadcasts or as a timeshare means to allow for a step of "simultaneously" (or at least apparently so) receiving two signals. These could be included as further programming within frequency scanner (19). Specifically, since GPS signals are only actually sensed for fractions of a second, the other portion of that time could be spent looking for other signals by the single differential correction receiver involved or sensing a second signal and comparing its accuracy to the first. Multiple differential corrections could also be received and utilized to increase accuracy or reliability even further by either one or more receivers. In addition, since the differential GPS correction might not change as dynamically as the actual GPS signals, the differential GPS correction could be utilized and processed for brief periods while the single differential subcarrier receiver (10) constantly updated or searched for the broadcast transmission involved to further enhance reliability and redundancy.

In keeping with the goal of providing uninterrupted differential GPS correction receipt, it is similarly possible to position the differential generator sites so as to be redundant. In this configuration, although each FM station (in one embodiment) might have a useable area over which differential GPS corrections could normally be provided, multiple stations having overlapping areas could be utilized so that in the event a single station were unavailable for one reason or another, uninterrupted reception of differential GPS correction could be provided to a specific site by merely switching to another differential GPS correction broadcast site. Thus, the overlapping signals themselves and generators could serve as a redundant dissemination means in a fashion similar to the way in which the multiple receivers or timeshare means served as a redundant reception means. Each would thus serve as a redundant correction means. Naturally, it could be advisable for each generator to have its own differential GPS correction so as to afford truly independent differential GPS correction signals. It could similarly be desirable to inform the user of the unavailability of an alternative signal or of an imminent loss of reliability.

Applications for this invention will be very broad. In the agriculture industry, this system would provide the accuracy of location necessary to provide or coordinate with mapping of crop yields and soil types for optimum fertilization and the like. With a higher level of accuracy, the signal could be used to navigate a tractor or airplane as it applies agrichemicals with no overlap of paths and no missed areas. The additional data delivery capabilities would facilitate the delivery of traffic control information, weather information, paging messages, headline news, and even stock market prices and the like. In addition, the information provided could be utilized by internal or external processing capabilities with or without the location information for a simplified display. Intelligent vehicle highway system (IVHS) information could also be provided. As only one such example, with the level of accuracy now practically possible, directions to a specific location—and even the precise turns to be made—could be displayed for a driver.

With reference to the claims, it can be seen that in many instances, one element is responsive to another element. This is meant in its broadest sense. For instance, since signal generator (5) outputs some signals which ultimately impact the operation of subcarrier generator (32), subcarrier generator (32) should be deemed responsive to signal generator (5). This is in spite of the fact that the output may be conditioned through other components. In the broad sense intended, all that is necessary for this example is that subcarrier generator (32) vary its operation based upon the output of signal generator (5) in order to be deemed "responsive" to signal generator (5). Intermediate processing or manipulation would not impact this responsiveness. Similarly as those skilled in the art would understand, many steps in the techniques discussed can be accomplished at varying points in time, in varying orders, and even at external locations. Naturally each such variation would fall within the scope of this patent. This is particularly true for the present invention since inputs can be provided at differing points and since processing capability can be achieved or distributed throughout the design or applied externally. As one example, the capabilities discussed with respect to differential processor (48) might be achieved within second processor (12) or might be distributed to other portions of the design or even achieved by a computer connected in some manner. Further, the receiver, might be completely integrated so as to contain both the FM and GPS reception capability by merely including an appropriate chip set, filter and the like. Hardwired or firmware designs rather than pure programming should also be understood to fall within the scope of this invention. Also it should be understood that the terms used for elements or components ("differential processor" and the like) are used to distinguish the component or element only; they are not intended to limit its scope as it is the result achieved by the element which is important, not its inherent function.

The foregoing discussion and the claims which follow describe a preferred embodiment of the present invention. Particularly, with respect to the claims, it should be understood that changes may be made without departing from the essence of the invention. In this regard it is intended that such changes would fall within the scope of the present invention. It simply is not practical to describe and claim all possible revisions to the present invention which may be accomplished. For instance, the claims are directed to both methods and apparatus. Although the methods related to the system have been included in various detail, only initial claims directed toward the reception or generation methods or toward the system apparatus or the generator or receiver apparatus have been included. Naturally, the disclosure of system or method context is sufficient to support the full scope of method and apparatus claims with the system, generator, and receiver focus as well. While these may be added to explicitly include such details, the existing claims should be construed to encompass such aspects. Without limitation, the present disclosure should be construed to encompass subclaims similar to those presented in a system or method context for the generator apparatus and methods and for the receiver apparatus and methods.

In addition, to the extent any revisions utilize the essence of the invention, each would naturally fall within the breadth of protection encompassed by this patent. This is particularly true for the present invention since its basic concepts and understandings are fundamental in nature and can be broadly applied.

I claim:

1. A method of accurately determining position using Navstar Global Position System (GPS) signals comprising the steps of:

a. receiving said GPS signals at a known location;

b. calculating a GPS signal-indicated location from said signals;

c. comparing said GPS signal-indicated location with said known location;

d. creating a first composite differential correction set indicative of a first correction with respect to said GPS signals in response to said step of comparing;

e. creating at least a second composite differential correction set in response to said step of comparing wherein said second composite differential correction set is independent from said first composite differential correction set, wherein said second differential correction set is indicative of a second correction with respect to said GPS signals, and wherein said second correction is different from said first correction;

f. disseminating said independent differential correction sets by transmission through electromagnetic broadcast;

g. receiving at least one of said differential correction sets at an unknown location;

h. receiving said GPS signals at said unknown location; and i. utilizing said differential correction set and said GPS signals to determine the location of said unknown location.

2. A method of accurately determining position using Navstar Global Position System (GPS) signals as described in claim 1 wherein said independent differential correction sets have varying accuracy.

3. A method of accurately determining position using Navstar Global Position System (GPS) signals as described in claim 2 wherein said step of disseminating said independent differential correction sets by transmission through electromagnetic broadcast comprises the step of disseminating said independent differential correction sets in one broadcast.

4. A method of accurately determining position using Navstar Global Position System (GPS) signals as described in claim 2 wherein said step of disseminating said independent differential correction sets by transmission through electromagnetic broadcast comprises the step of transmitting said independent differential correction sets on a subcarrier broadcast.

5. A method of accurately determining position using Navstar Global Position System (GPS) signals as described in claim 4 wherein said electromagnetic broadcast is broadcast at a predominant frequency of between about 88 and 108 MHz.

6. A method of accurately determining position using Navstar Global Position System (GPS) signals as described in claim 4 wherein said step of transmitting said independent differential correction sets on a subcarrier broadcast comprises the step of transmitting more than one adjacent subcarrier broadcast.

7. A method of accurately determining position using Navstar Global Position System (GPS) signals as described in claim 4 or 6 wherein said step of transmitting said independent differential correction sets on a subcarrier broadcast comprises at least one subcarrier transmission having a transmission rate of at least 600 bits per second.

8. A method of accurately determining position using Navstar Global Position System (GPS) signals as described in claim 4 wherein said step of disseminating said independent differential correction sets by transmission through electromagnetic broadcast comprises the step of interleaving more than one signal in said electromagnetic broadcast.

9. A method of accurately determining position using Navstar Global Position System (GPS) signals as described in claim 3, 4, or 5 and further comprising the step of transmitting an information signal as part of said electromagnetic braodcast.

10. A method of accurately determining position using Navstar Global Position System (GPS) signals as described in claim 9 wherein said information signal is addressed to an individual receiver.

11. A method of accurately determining position using Navstar Global Position System (GPS) signals as described in claim 10 wherein said information signal enables receipt of at least one of said independent differential correction sets by said receiver.

12. A method of accurately determining position using Navstar Global Position System (GPS) signals as described in claim 3, 4, or 5 wherein said step of receiving at least one of said independent differential correction sets at an unknown location is accomplished by an individual receiver and further comprising the step of transmitting an information signal addressed to said individual receiver.

13. A method of accurately determining position using Navstar Global Position System (GPS) signals as described in claim 12 wherein said information signal enables receipt of at least one of said independent differential correction sets by said receiver.

14. A method of accurately determining position using Navstar Global Position System (GPS) signals as described in claim 1, 2, or 5 wherein said step of disseminating said independent differential correction sets by transmission through electromagnetic broadcast comprises the step of encrypting at least some of said independent differential correction sets.

15. A method of accurately determining position using Navstar Global Position System (GPS) signals as described in claim 12 or 13 wherein said step of disseminating said independent differential correction sets by transmission through electromagnetic broadcast comprises the step of encrypting at least some of said independent differential correction sets.

16. A method of generating differential corrections for use with Navstar Global Position System (GPS) signals comprising the steps of:

a. receiving said GPS signals at a known location;

b. calculating a GPS signal-indicated location from said signals;

c. comparing said GPS signal-indicated location with said known location;

d. creating a first composite differential correction set with respect to said GPS signals in response to said step of comparing;

e. creating at least a second composite differential correction set in response to said step of comparing wherein said second composite differential correction set is independent from said first composite differential correction set, wherein said second differential correction set is indicative of a second correction with respect to said GPS signals, and wherein said second correction is different from said first correction; and f. disseminating said independent differential correction sets by transmission through electromagnetic broadcast.

17. A system for accurately determining position using Navstar Global Position System (GPS) signals comprising:

a. a first receiver situated at a known location and responsive to said GPS signals;

b. a first processor responsive to said first receiver;

c. a comparison means responsive to said first processor which creates a comparative representation based upon said GPS signals and data representative of said known location;

d. a signal generator responsive to said comparative representation which creates a first composite differential correction set indicative of a first correction;

e. a signal generator responsive to said comparative representation which creates at least a second composite differential correction set, wherein said second composite differential correction set is independent from said first composite differential correction set, wherein said second differential correction set is indicative of a second correction, and wherein said second correction is different from said first correction;

f. an electromagnetic broadcast transmitter responsive to said first independent differential correction set;

g. an electromagnetic broadcast transmitter responsive to said at least second independent differential correction set;

h. a second receiver responsive to said GPS signals;

i. a differential correction receiver responsive to at least one of said electromagnetic broadcasts; and j. a second processor responsive to both said differential correction receiver and said second receiver and capable of determining the location of said second receiver.

18. A system for accurately determining position using Navstar Global Position System (GPS) signals as described in claim 17 wherein said signal generator creates independent differential correction sets which have varying degrees of accuracy.

19. A system for accurately determining position using Navstar Global Position System (GPS) signals as described in claim 18 wherein said electromagnetic broadcast transmitter comprises a subcarrier generator.

20. A system for accurately determining position using Navstar Global Postion System (GPS) signals as described in claim 19 wherein said electromagnetic broadcast transmitter creates a signal which is broadcast at a predominant frequency of between about 88 and 108 MHz.

21. A system for accurately determining position using Navstar Global Position System (GPS) signals as described in claim 19 wherein said subcarrier generator creates adjacent multichannel subcarrier transmissions.

22. A system for accurately determining position using Navstar Global Position System (GPS) signals as described in claim 19 or 21 wherein said signal generator creates a signal of more than 600 bits per second.

23. A system for accurately determining position using Navstar Global Position System (GPS) signals as described in claim 19 and further comprising a combiner responsive to said independent differential correction sets.

24. A system for accurately determining position using Navstar Global Position System (GPS) signals as described in claim 19 or 20 and further comprising an information signal generator and wherein said subcarrier generator is responsive to said information signal generator.

25. A system for accurately determining position using Navastar Global Position System (GPS) signals as described in claim 24 and further comprising a controllable address generator and wherein said subcarrier generator is responsive to said controllable address generator.

26. A system for accurately determining position using Navstar Global Position System (GPS) signals as described in claim 25 and further comprising an enablement means responsive to said electromagnetic broadcast transmitter.

27. A system for accurately determining position using Navstar Global Position System (GPS) signals as described in claim 17, 18, or 20 and further comprising an encryption means connected so as to affect at least one of said independem differential correction sets.

28. A differential correction generator for use with Navstar Global Position System (GPS) signals comprising:

a. a receiver situated at a known location and responsive to said GPS signals;

b. a processor responsive to said receiver;

c. a comparison means responsive to said processor, which creates a comparative representation, and having available to it data representative of said known location;

d. a signal generator responsive to said comparative representation which creates a first composite differential correction set indicative of a first correction;

e. a signal generator responsive to said comparative representation which creates at least a second composite differential correction set, wherein said second composite differential correction set is independent from said first composite differential correction set, wherein said second differential correction set is indicative of a second correction, and wherein said second correction is different from said first correction;

f. an electromagnetic broadcast transmitter responsive to said first independent differential correction set; and g. an electromagnetic broadcast transmitter responsive to said at least second independent differential correction set.

* * * * *